United States Patent
Feng

(10) Patent No.: US 11,186,049 B2
(45) Date of Patent: Nov. 30, 2021

(54) PLY SPLICING FOR COMPOSITE CHARGES THAT ARE SHAPED TO SPANWISE CONTOURS

(71) Applicant: The Boeing Company, Chicago, IL (US)

(72) Inventor: Cynthia G. Feng, Seattle, WA (US)

(73) Assignee: The Boeing Company, Chicago, IL (US)

( * ) Notice: Subject to any disclaimer, the term of this patent is extended or adjusted under 35 U.S.C. 154(b) by 275 days.

(21) Appl. No.: 16/110,966

(22) Filed: Aug. 23, 2018

(65) Prior Publication Data

US 2020/0061940 A1 Feb. 27, 2020

(51) Int. Cl.
| | | |
|---|---|---|
| B29C 65/00 | (2006.01) | |
| B29C 70/54 | (2006.01) | |
| B29C 70/38 | (2006.01) | |
| B29L 31/30 | (2006.01) | |
| B29K 307/04 | (2006.01) | |
| G06F 30/15 | (2020.01) | |
| B29C 65/78 | (2006.01) | |

(52) U.S. Cl.
CPC .............. *B29C 70/54* (2013.01); *B29C 70/38* (2013.01); *B29C 65/00* (2013.01); *B29C 65/782* (2013.01); *B29C 65/7832* (2013.01); *B29C 66/05* (2013.01); *B29C 66/41* (2013.01); *B29C 66/4722* (2013.01); *B29C 66/721* (2013.01); *B29C 66/723* (2013.01); *B29K 2307/04* (2013.01); *B29L 2031/3076* (2013.01); *G06F 30/15* (2020.01)

(58) Field of Classification Search
CPC ... B29C 65/00; B29C 65/782; B29C 65/7832; B29C 66/05; B29C 66/41; B29C 66/4722; B29C 66/721; B29C 66/723
See application file for complete search history.

(56) References Cited

U.S. PATENT DOCUMENTS

| | | | |
|---|---|---|---|
| 7,968,169 B2 | 6/2011 | Gleason et al. | |
| 9,464,435 B2 * | 10/2016 | Ku | ............................ E04B 2/00 |
| 2005/0161154 A1 * | 7/2005 | Anderson | ............... B32B 27/12 |
| | | | 156/278 |
| 2011/0233338 A1 | 9/2011 | Stewart | |
| 2012/0076973 A1 | 3/2012 | Guzman et al. | |

(Continued)

FOREIGN PATENT DOCUMENTS

KR 20180002017 A 1/2018

OTHER PUBLICATIONS

Michael C. Niu; Composite Airframe Structures, Practical Design Information and Data; XP055252650; Dec. 31, 1992.

(Continued)

*Primary Examiner* — Mark A Osele
*Assistant Examiner* — Nickolas R Harm
(74) *Attorney, Agent, or Firm* — Duft & Bornsen, PC

(57) ABSTRACT

Systems and methods are provided for designing composite parts. One embodiment is a method for fabricating a composite part. The method includes receiving a design that defines a stacking sequence for a composite charge comprising plies that have different fiber orientations, defining a splice zone within the design, modifying the design by splicing plies in a manner that accommodates ply slippage when the composite charge is formed to a contour, and fabricating a composite part based on the design that was modified.

20 Claims, 13 Drawing Sheets

(56) References Cited

U.S. PATENT DOCUMENTS

2018/0229452 A1* 8/2018 Ogale ............... B29C 66/73115
2019/0070772 A1* 3/2019 Stone ...................... B29C 70/46

OTHER PUBLICATIONS

Netherlands Search Report; Application NL2021782; dated Jul. 25, 2019.
Plivier Guillermin Ed; Computer-Aided Design; XP002628834; Dec. 1, 2001.
European Search Report; Application 19193446.2-1224; dated Jan. 27, 2020.
U.S. Appl. No. 15/918,508.

* cited by examiner

PLY SPLICING FOR COMPOSITE CHARGES THAT ARE SHAPED TO SPANWISE CONTOURS

FIELD

The disclosure relates to the field of composite parts, and in particular, to forming composite charges into a desired shape.

BACKGROUND

Composite parts fulfill a variety of demanding structural roles in buildings and vehicles (e.g., aircraft). For example, composite parts may be used within aircraft to define portions of an airframe. Such composite parts may be shaped according to complex contours in order to accommodate aerodynamic and structural needs.

Complex parts are hardened from composite charges that include plies of unhardened fiber reinforced material. In order to shape a composite charge into a desired shape for a composite part, the composite charge may be laid up in the flat state and then pressed by a mandrel and die. This causes the composite charge to achieve a desired contour. However, the forming process itself may result in an undesirable discrepancy in shape (wrinkle) as plies within the composite charge slip relative to each other in response to forces applied by the mandrel and die. The magnitude of a discrepancy may vary within a composite charge based on a magnitude of curvature being applied to the previously flat composite charge. If a discrepancy is out-of-tolerance, then the composite charge may have to be reshaped or discarded.

Therefore, it would be desirable to have a method and apparatus that take into account at least some of the issues discussed above, as well as other possible issues.

SUMMARY

Embodiments described herein design and/or fabricate composite charges that include splice zones where plies are subdivided into ply segments that are spliced together. The ply segments may partially overlap via a lap splice, form a butt splice, or form any other suitable splice geometry. The use of a splice enables ply segments to partially slip with respect to each other when a composite charge is being shaped, which in turn accommodates the shaping process and reduces the chances of discrepancies being formed in a resulting composite part. One embodiment is a method for fabricating a composite part. The method includes receiving a design that defines a stacking sequence for a composite charge comprising plies that have different fiber orientations, defining a splice zone within the design, modifying the design by splicing plies in a manner that accommodates ply slippage when the composite charge is formed to a contour, and fabricating a composite part based on the design that was modified.

A further embodiment is a non-transitory computer readable medium embodying programmed instructions which, when executed by a processor, are operable for performing a method for fabricating a composite part. The method includes receiving a design that defines a stacking sequence for a composite charge comprising plies that have different fiber orientations, defining a splice zone within the design, modifying the design by splicing plies in a manner that accommodates ply slippage when the composite charge is formed to a contour, and fabricating a composite part based on the design that was modified.

A further embodiment is a system for designing a composite part. The system includes a memory storing a design that defines a stacking sequence for a composite charge comprising plies that have different fiber orientations, a controller that defines a splice zone within the design, modifies the design by splicing plies in a manner that accommodates ply slippage when the composite charge is formed to a contour, and a layup machine that fabricates a composite part based on the design that was modified.

A further embodiment is a method of fabricating a composite part. The method includes receiving a design that defines a stacking sequence of plies for a composite charge, and automatically locating splice zones at spanwise regions within the composite charge to allow ply slippage to accommodate layup limitations selected from the group consisting of lay up curvature, stayout zones, locations of ply ramps for the composite charge, punch former station locations, and manufacturing minimum ply lengths.

Yet another embodiment is a non-transitory computer readable medium embodying programmed instructions which, when executed by a processor, are operable for performing an automated scripted method for designing a composite part. The method includes identifying a fiber orientation that accommodates ply slippage when a composite charge is formed to a spanwise contour, selecting a location of a splice zone based on factors selected from the group consisting of a contour of the composite charge, stayout zones at the composite charge where splicing is disallowed, locations of ply ramps for the composite charge, locations of stations that form the composite charge into the predefined spanwise contour, and predefined minimum ply lengths for the composite charge, and for the splice zone, iteratively performing the following steps: determining that there is a next ply having the fiber orientation within a stacking sequence for the composite charge that has not yet been spliced; and subdividing the next ply into two ply segments that overlap each other by a desired overlap distance.

A still other embodiment is a method of laying up a composite charge. The method includes informing a Numerical Control (NC) program for laying up a charge in a flat shape comprising plies having fibers; and splicing plies where the fibers will be in compression or tension when the flat charge is formed from the flat shape to another shape.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, may be initially laid-up in multiple layers that together are referred to as a composite charge. Individual fibers within each layer of the composite charge are aligned parallel with each other, but different layers may exhibit different fiber orientations in order to increase the strength of the resulting composite part along different dimensions. The composite charge may include a viscous resin that solidifies in order to harden the composite charge into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
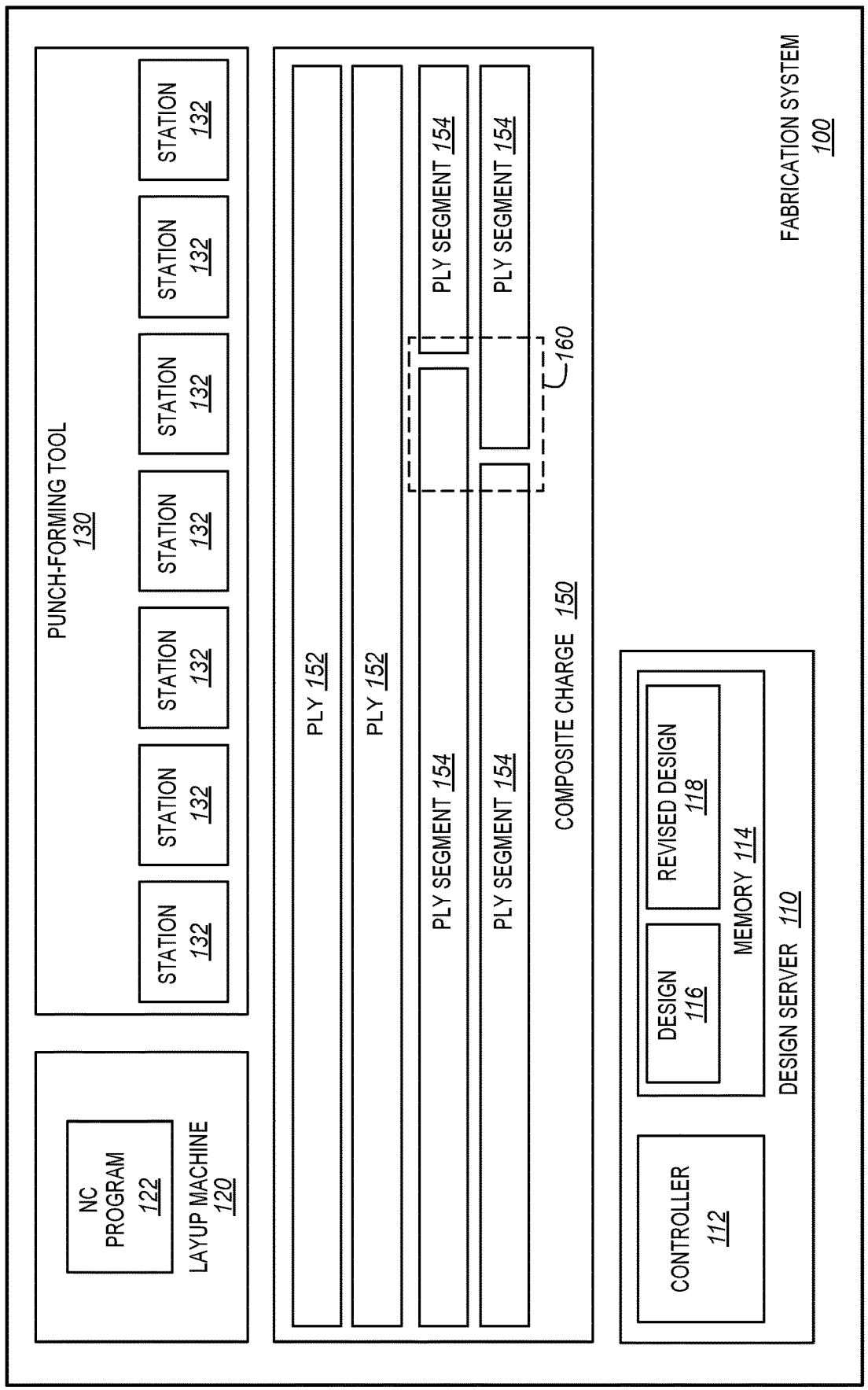
FIG. 1 is a block diagram of a fabrication system for composite charges in an illustrative embodiment.

FIG. 1 is a block diagram of a fabrication system 100 for composite charges in an illustrative embodiment. Fabrication system 100 comprises any system, devices, or components operable to facilitate design and/or fabrication of a composite charge. In this embodiment, fabrication system 100 includes design server 110, which generates designs for composite charges. Fabrication system 100 also includes layup machine 120 which lays up plies of fiber reinforced material in order to create a composite charge 150, and punch-forming tool 130 which shapes the composite charge 150 into a desired shape.

In this embodiment, design server 110 comprises a controller 112 which receives one or more designs 116 for composite charges and generates one or more of the revised designs 118. Design server 110 further comprises memory 114 which stores the designs 116. Controller 112 may store a revised design 118 for a composite charge as a series of layup instructions for layup machine 120. For example, a revised design 118 may inform a Numerical Control (NC) program (e.g., NC program 122) that provides course start and stop locations for layup machine 120, by providing a designed start and stop of each ply or ply segment along a spanwise direction. Controller 112 may be implemented, for example, as custom circuitry, as a hardware processor executing programmed instructions, or some combination thereof.

Layup machine 120 may comprise an Automated Tape Layup (ATL) machine, Automated Fiber Placement (AFP) machine, etc. for laying up tows of carbon fiber reinforced material. Meanwhile, punch-forming tool 130 may comprise one or more stations 132 which each apply force to shape composite charge 150 into a desired cross-sectional and/or spanwise shape. Stations 132 may be equidistantly located with respect to each other along the spanwise direction, or may be separated by different distances as desired. For example, each of the stations 132 may be eighteen inches apart from at least one other station.

Composite charge 150 includes multiple plies 152. Some plies 152 within composite charge 150 have been subdivided into ply segments 154. These ply segments 154 are spliced together within splice zone 160, in order to accommodate ply slippage during the forming process. Notably, composite charge 150 may be laid-up as a flat rectangular section, and then shaped to a desired contour without forming wrinkles of more than a desired tolerance. This substantially expedites the layup process and increases layup speed for composite charge 150.

Figure 2:
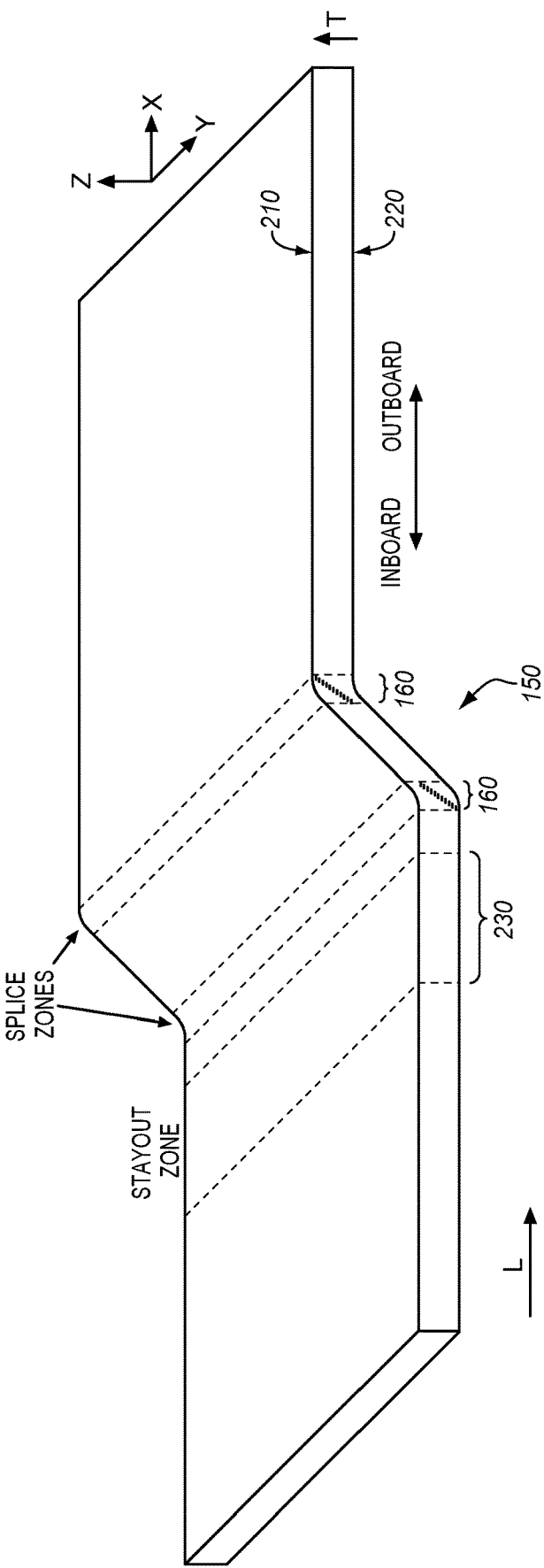
FIG. 2 is an isometric view of a composite charge designed by a fabrication system to include splice zones in an illustrative embodiment.

FIG. 2 is an isometric view of a composite charge 150 designed by a fabrication system to include splice zones in an illustrative embodiment. In this embodiment, composite charge 150 has a thickness T from a top ply 210 to a bottom ply 220, and is formed to a spanwise contour 240. In further embodiments, composite charge 150 may include joggles, twists, bends, or other features. Composite charge 150 also includes splice zones 160, as well as a stayout zone 230 in which splice zones 160 are forbidden from being placed. Splice zones 160 and stayout zone 230 occupy portions of the length L of composite charge 150. Furthermore, splice zones 160 have been placed in or near regions having high curvature, in order to help accommodate ply slippage. In effect, the splice zones 160 are laid up flat and facilitate ply slippage when composite charge 150 is formed around a curvature. While in this embodiment composite charge 150 has a length that proceeds from inboard to outboard, in further embodiments the composite charge 150 may occupy any suitable orientation.

Illustrative details of the operation of fabrication system 100 will be discussed with regard to FIG. 3. Assume, for this embodiment, that a design 116 has been created for composite charge 150, and that the design 116 includes plies at a variety of fiber orientations in order to impart a desired level of strength to a resulting composite part. However, while the fiber orientations for the plies 152 have been chosen, there remains a risk that portions of the composite charge may experience stresses when shaped by punch-forming tool 130 that will lead to discrepancies. To address this concern, the design 116 is sent to design server 110 for analysis and revision.

Figure 3:
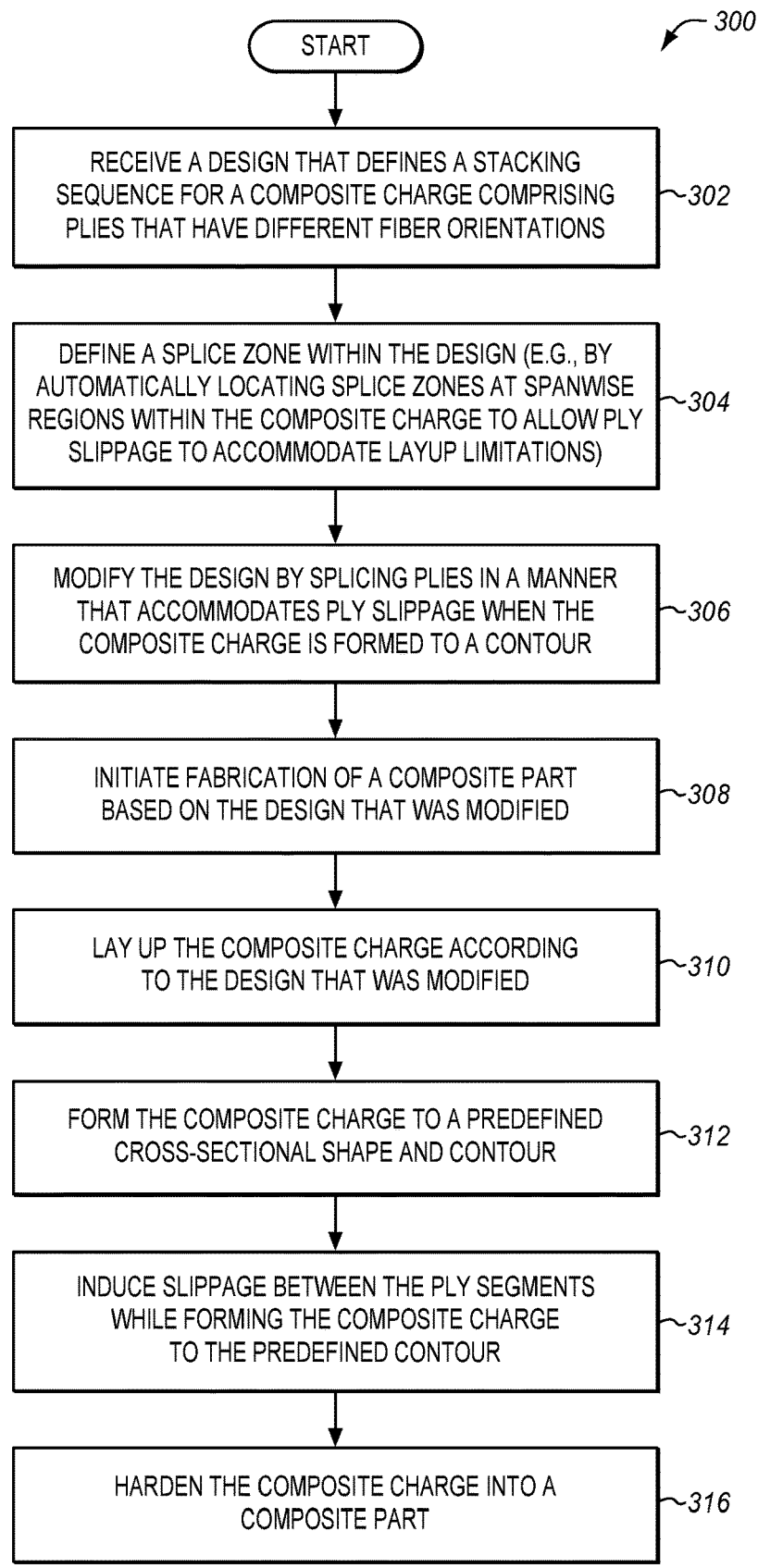
FIG. 3 is a flowchart illustrating a method for fabricating a composite charge in an illustrative embodiment.

FIG. 3 is a flowchart illustrating a method 300 for revising a design 116 for a composite charge 150, and fabricating the composite charge 150 in an illustrative embodiment. The steps of method 300 are described with reference to fabrication system 100 of FIG. 1, but those skilled in the art will appreciate that method 300 may be performed in other systems. The steps of the flowcharts described herein are not all inclusive and may include other steps not shown. The steps described herein may also be performed in an alternative order.

In step 302, controller 112 receives a design 116 that defines a stacking sequence for composite charge 150. The design 116 includes plies 152 that have different fiber orientations, including plies 152 having a fiber orientation of zero degrees, which in this embodiment is the orientation most likely to experience ply slippage during a shaping/forming process. The design 116 may comprise a design that informs NC program 122, a delineated set of instructions for laying up courses of CFRP, etc. With the design 116 received, controller 112 initiates a process of revising the design 116 to prevent discrepancies from forming in a composite charge 150 during the punch-forming process.

As a part of this process, controller 112 may attempt to identify spanwise regions within design 116 that will be shaped to a radius of curvature smaller than a predefined size, or may attempt to identify spanwise regions within design 116 that will experience a greatest amount of bending stress during punch-forming. Controller 112 may for example consult a Computer Aided Design (CAD) model, chart or other data indicating amounts of curvature applied to composite charge 150 along the spanwise length of composite charge 150. In further embodiments, locations for splice zones 160 based on factors such as the predefined spanwise contour of the composite charge (as discussed above), stayout zones at the composite charge where splicing is disallowed (as discussed with regard to FIGS. 7-9), locations of ply ramps for the composite charge, locations of stations that form the composite charge into the predefined spanwise contour, and predefined minimum ply lengths for the composite charge.

In step 304, controller 112 defines a splice zone 160 within the design 116 that will accommodate ply slippage when the composite charge 150 is formed/shaped. This may comprise automatically locating splice zones at spanwise regions within the composite charge to allow ply slippage to accommodate layup limitations selected from the group consisting of lay up curvature, stayout zones, locations of ply ramps for the composite charge, punch former station locations, and manufacturing minimum ply lengths. The splice zone presents a benefit because its accommodation of ply slippage means that composite charge 150 may be laid-up as a flat laminate without curvature, and then shaped to a spanwise contour. Flat layup processes for a composite charge 150 may be substantially faster than laying up the composite charge 150 along a curve. That is, it is more efficient to lay up on one flat mandrel and then curve to a desired shape than to lay up on a multitude of curved mandrels. Hence, the addition of splice zones enhances fabrication speed while also ensuring that if any wrinkles are formed the wrinkles do not exceed tolerance. A splice zone 160 is a region wherein contiguous plies within the design 116 are subdivided into multiple ply segments 154 which are spliced together. This enables fibers in ply segments 154 to slip with respect to fibers in other ply segments 154, in contrast to contiguous plies whose fibers would be placed into tension by the forming/shaping process (e.g., punch-forming or other processes). Stated once again, the splice zones 160 are used within a flat layup where fibers are only in tension when the layup is formed from a flat shape to a curvature. The splice zones splice flat plies which would otherwise have the potential for experiencing fiber tension or compression during forming which would lead to wrinkle formation. Controller 112 may then define one or more splice zones 160 as desired. For example, controller 112 may define a splice zone 160 in each spanwise region identified above, such as in spanwise regions having a high degree of curvature.

With the understanding that splice zones may be located in regions having high curvature, the size of each splice zone 160 may be a function of a desired amount of overlap between plies, as well as a known "tolerance" of layup machine 120. "Tolerance" refers to discrepancies between an intended start or stop location for a course, and the actual start or stop location for the course when it is applied by layup machine 120. It is not uncommon, for example, for a splice zone to be designed for an overlap distance of half of an inch, and a tolerance distance of one tenth of an inch. In such circumstances, the length of a splice zone 160 in the spanwise direction may equal the number of plies being spliced, multiplied by a quantity equal to the overlap distance plus the tolerance distance plus any stagger distance of layup machine 120. Stagger is an as-designed distance between splices, and may for example be defined as a minimum of the overlap plus the tolerance. Stagger avoids the possibility of double overlaps in one location within a given design. Stagger is illustrated, for example, by stagger 660 of FIG. 6. In this manner, the splicing may be based on an overlap distance between the ply segments 154 and a tolerance of layup machine 120, which will be laying up the ply segments 154.

In step 306, controller 112 modifies the design 116 to create revised design 118, by splicing the plies 152 in a manner that will accommodate ply slippage when the composite charge 150 is formed to a contour (e.g., a spanwise contour). Each splice is placed within a splice zone, and splice zones are prevented from overlapping each other. In one embodiment, this comprises splicing only plies having a fiber orientation that will accommodate ply slippage when they are spliced and the composite charge 150 is formed to a spanwise contour. In this embodiment, such plies are zero-degree plies (i.e., plies having fibers that continue along the composite charge 150 in the spanwise direction). Plies having a fiber orientation of zero degrees in this embodiment may be the plies most likely to generate a discrepancy when shaped to a spanwise contour 240, because their fibers are most likely to be put into compression when a spanwise contour 240 is applied. Thus, splicing these plies 152 reduces discrepancies from forming in plies 152 that would otherwise be most expected to encounter discrepancies when conformed to spanwise contour 240. Splicing plies having fiber orientations that would normally be placed in tension by the forming process (e.g., zero-degree plies, plies deviating from zero by plus or minus fifteen degrees, plus or minus five degrees, plus or minus one degree, plies having a plus or minus forty-five degree fiber orientation etc.). also helps to maintain a strength of the composite charge 150 with respect to other fiber orientations. This results in revised design 118.

As a part of step 306, splice zones may initially be placed in locations that overlap stayout zones. To address this issue, controller 112 may determine whether ply segments for a splice zone fall within a stayout zone. If they do, controller 112 may shift a splice zone as described in FIG. 8 and start over.

In step 308, controller 112 initiates fabrication of a composite charge 150 based on the revised design 118. This may comprise transmitting layup instructions to layup machine 120. In step 310, layup machine 120 lays up the composite charge 150 according to the revised design 118. Therefore, layup machine 120 proceeds to lay up the plies 152 that constitute the composite charge 150, and lays up one or more splice zones 160 within the composite charge 150. Within each splice zone 160, zero-degree plies are spliced to accommodate slippage in accordance with the revised design 118. The composite charge 150 may then be completed and moved to punch-forming tool 130. Although punch-forming tool 130 is discussed herein, other types of forming may be utilized as desired, such as stamp-forming, etc. At this stage, the composite charge 150 may for example comprise a flat rectangular or other flat laminate shape lacking contouring.

Figure 5:
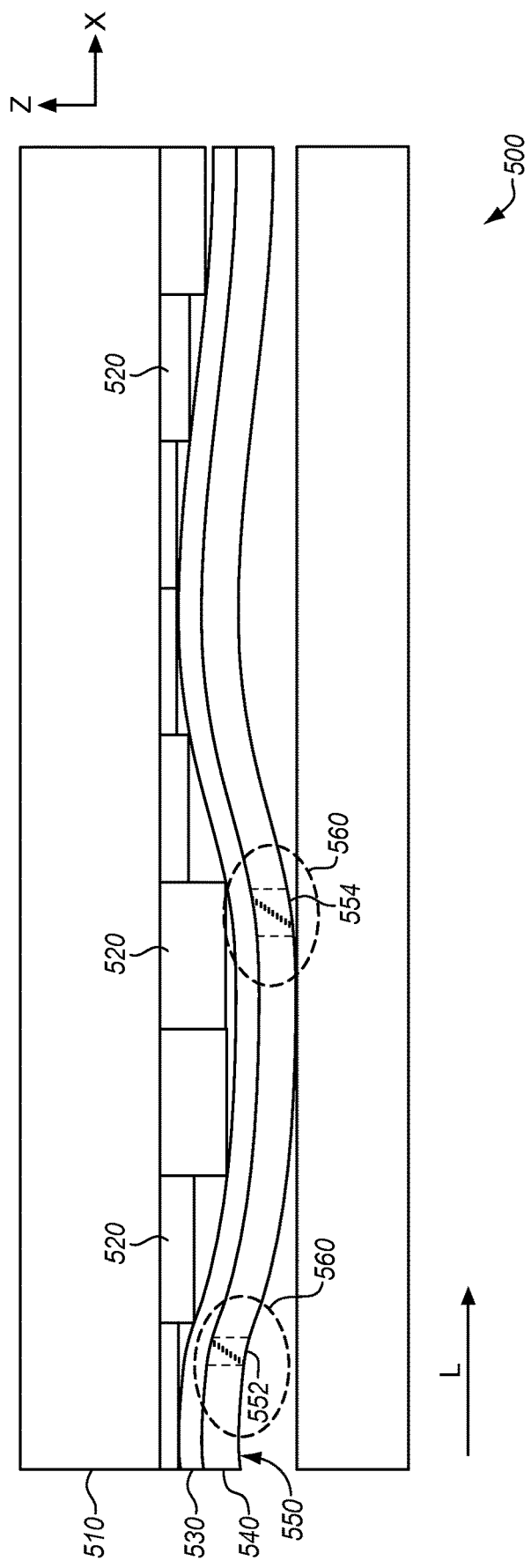
FIG. 5 is a side view of a composite charge conforming to a span-wise contour in an illustrative embodiment.

In step 312, the composite charge 150 is formed to a predefined cross-sectional shape and predefined contour (e.g., a predefined spanwise contour). For example, punch-forming tool 130 may punch-form composite charge 150. Other methods of forming, such as AFP techniques, vacuum bagging, drape forming, etc. could be used. As illustrated in FIG. 5 and discussed below, the stations also impart a spanwise contour to the composite charge 150.

In step 314, the act of forming induces slippage between the ply segments while forming the composite charge 150 to the predefined spanwise contour. The splice zones 160 included in the composite charge 150 accommodate this slippage reducing the likelihood/size of wrinkles being formed within the composite charge 150, because the fibers within the ply segments are free to slip with respect to fibers of other ply segments, instead of being drawn into compression as would happen with a single contiguous zero-degree ply.

In step 316, the composite charge 150 is hardened into a composite part. For example, if the composite charge 150 includes a thermoplastic resin, the composite charge 150 may be cooled below a melting temperature of the resin. If the composite charge 150 includes a curable resin, then the composite charge 150 may be heated to a curing temperature and/or pressurized in order to form a composite part.

Method 300 provides a substantial advantage over prior systems, because it rapidly and effectively inserts the splice zones 160 into designs 116 for composite parts that would otherwise exhibit discrepancies during the forming process. This reduces the number of composite charges 150 that are discard or recycled during the fabrication of composite parts, which increases speed and reduces overall cost.

Figure 4:
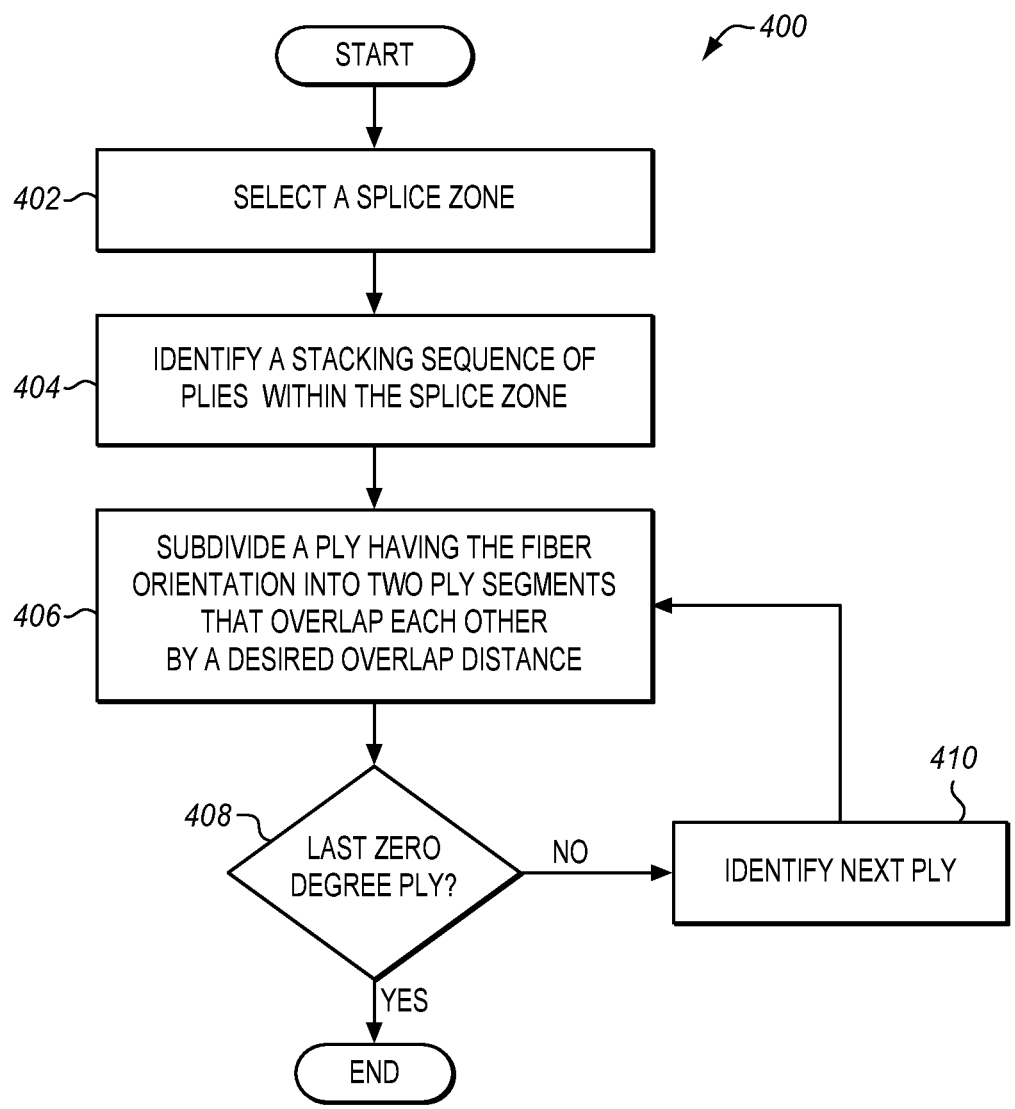
FIG. 4 is a flowchart illustrating a method for modifying a design to include a splice zone that accommodates ply slippage in an illustrative embodiment.
Figure 6:
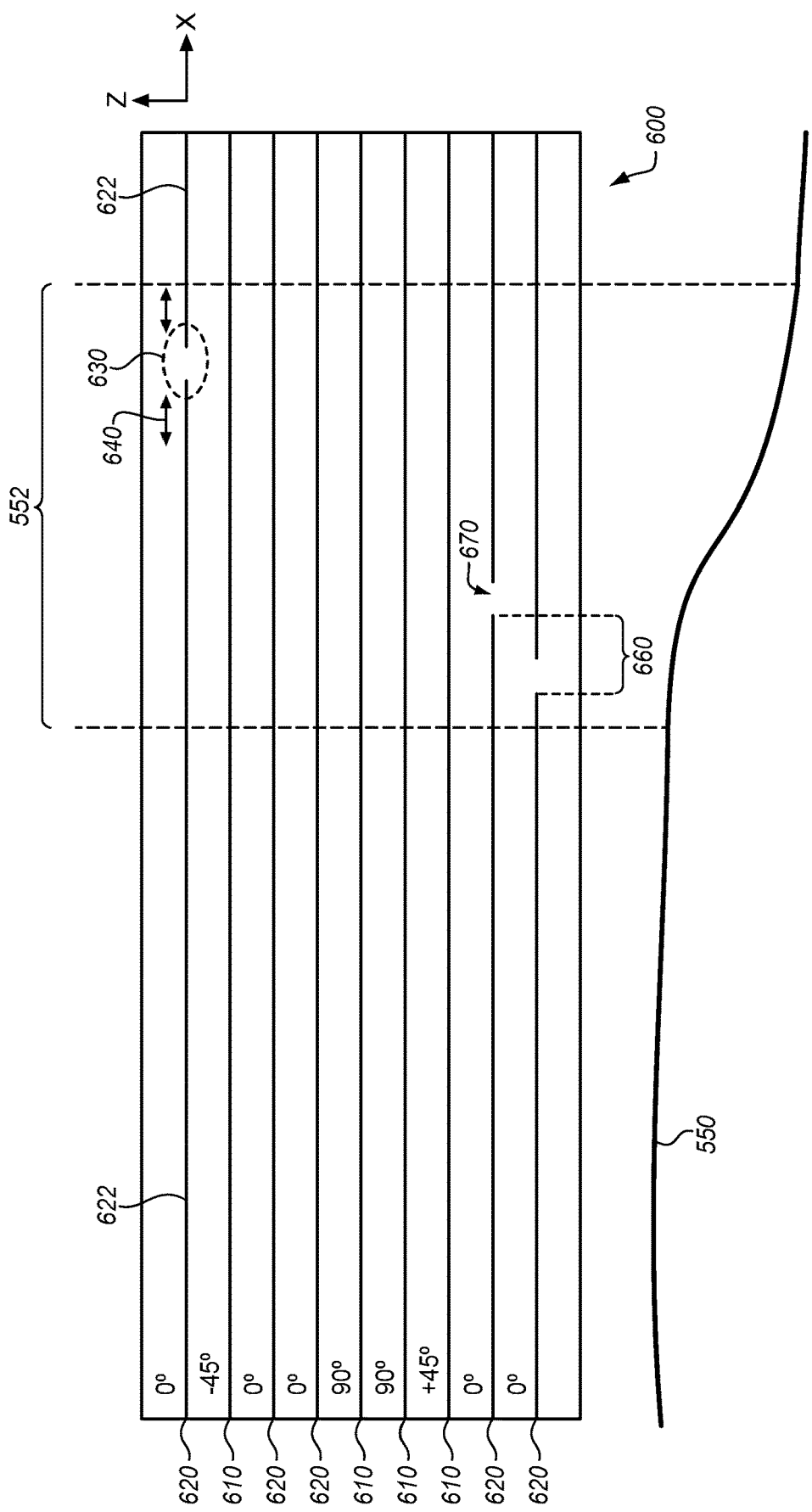
FIG. 6 is a diagram illustrating a design for a composite charge that includes a butt splice in an illustrative embodiment.

FIG. 4 is a flowchart illustrating a method 400 for modifying a design to include a splice zone in an illustrative embodiment. For example, method 400 may be performed as a part of step 306 of FIG. 3. As a part of the splicing process, controller 112 may select a splice zone 160 (step 402), and identify a stacking sequence of plies (e.g., as shown in FIG. 6) within the splice zone 160 (step 404). Controller 112 may then subdivide a ply having the fiber orientation that accommodates slippage (e.g., a topmost zero degree ply) of the stacking sequence into two ply segments that overlap each other by the desired overlap distance, wherein the most outboard portion of the overlap abuts a most outboard portion of the splice zone 160 (step 406). Controller 112 determines whether there is a next ply in the stacking sequence that has not yet been spliced and has the fiber orientation (step 408). If the ply that was most recently spliced is not the last ply having the fiber orientation, controller 112 identifies a next ply having the fiber orientation (e.g., a next topmost zero-degree ply) (step 410), and subdivides that next ply into two ply segments that overlap each other by the desired overlap distance when returning to step 406. A most outboard portion of this overlap may abut a most inboard portion of the prior overlap. This process may continue throughout the stacking sequence until all plies having the fiber orientation have been spliced. This process ensures that cuts/overlaps within a splice zone are evenly distributed across the length of the splice zone. In further embodiments, individual cuts/overlaps may all be aligned at the same spanwise position, may form a delta or "V" shape, chevron, etc. so long as structural strength is maintained.

In short, controller 112 may iteratively perform the steps of determining that there is a next ply having the fiber orientation within the stacking sequence that has not yet been spliced, and subdividing the next ply into two ply segments that overlap each other by a desired overlap distance.

A Numerical Control (NC) program may then be defined based on the design that was modified, by including instructions for laying up the ply segments and including gaps between the ply segments.

FIG. 5 is a side view of a composite charge 540 conforming to a span-wise contour in an illustrative embodiment. In this embodiment, a punch-forming tool 500 is shaping composite charge 540. Punch-forming tool 500 includes stations 520 which may be actuated to adjust their position with respect to body 510. The movements of stations 520 perturb flexible die 530, which in turn imparts curvature 550 to composite charge 540. Regions 560 exceed a threshold amount of bending stress during the forming process, and which are accommodated via splice zones 552-554, are also illustrated.

Figure 7:
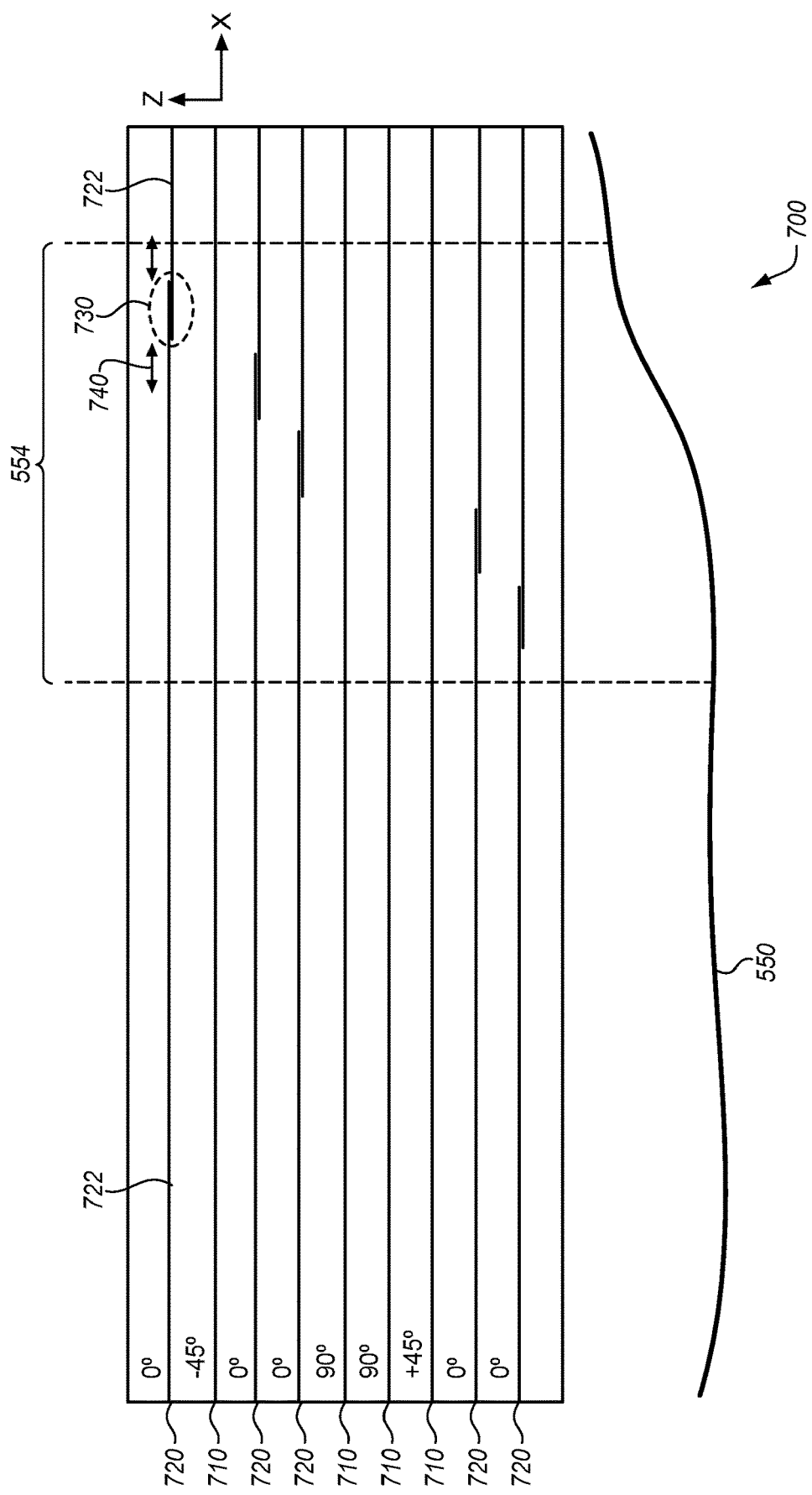
FIG. 7 is a diagram illustrating a design for a composite charge that includes a lap splice in an illustrative embodiment.

FIGS. 6-7 illustrate side views of regions 560 of composite charge 540, wherein zero-degree plies have fiber orientations that proceed from left to right across the page. In this embodiment, the inclusion of splice zones at plies having fiber orientations that help to accommodate ply slippage. Specifically, FIG. 6 is a diagram illustrating a design for a composite charge that includes a butt splice in an illustrative embodiment, while FIG. 7 is a diagram illustrating a design for a composite charge that includes a lap splice in an illustrative embodiment.

As shown in FIG. 6, design 600 has been laid out along a length of the composite charge 150, and curvature 550 is provided for context to illustrate how the composite charge 150 will be shaped. Design 600 includes zero-degree plies 620, and also includes plies 610 of other fiber orientations. In design 600 each zero-degree ply has been subdivided into ply segments 622 within the region of splice zone 552 (comprising butt splices). Space inserted between ply segments 622 at region 630 facilitates ply slippage in directions 640 (e.g., directions roughly parallel to the fiber orientation) during formation, resulting in a butt splice having gaps 670. Stagger 660 is also illustrated. By accounting for stagger 660, design 600 ensures that no lengthwise portions of splice zone 552 have multiple overlaps which would increase thickness beyond a desired amount. FIG. 7 illustrates a splice zone that is similar to FIG. 6, in that design 700 is provided alongside curvature 550, includes zero-degree plies 720, and also includes plies 710 of other fiber orientations. Design 700 may be implemented with design 600 in a different splice zone, or may be implemented in a different embodiment. In design 700 each zero-degree ply has been subdivided into ply segments 722 within the region of splice zone 554 (comprising lap splices). The overlap created between ply segments 722 at region 730 facilitates ply slippage in directions 740 along the length of a composite charge during formation. Although the stacking sequences illustrated for FIGS. 6-7 are not symmetrical (i.e., the combination of fiber orientations of plies is not the same from top to bottom as it is from bottom to top), in further embodiments any stacking sequence may be spliced according to the techniques described above, including symmetrical stacking sequences.

For each design shown in FIGS. 6-7, the location of each cut/subdivision of a ply within a splice zone may be the same for each zero-degree ply, or may change incrementally as the stacking sequence of a design is traversed, such that the splices are evenly distributed along the length of the splice zone.

As part of the design process, a user may indicate regions 560 of the composite charge that are defined as "stayout zones." A stayout zone (e.g., stayout zone 910 of FIG. 9) is a location where splices are not desired. For example, a stayout zone may indicate a region where a fastener will be driven (e.g., installed) through the composite charge, such as a region expected to intersect another part such as a rib, a land region, a bond region, an area where the composite charge will be cut after it is cured, a region where the composite charge reduces in thickness, etc. A land is a surface where another structure touches the composite charge, typically at an interface or joint. A splice zone may result in an undesired amount of thickness at such a location, or may result in less fiber continuity than desired at such a location. A stayout zone may also comprise a spanwise region where a thickness of the composite charge is reduced.

Figure 8:
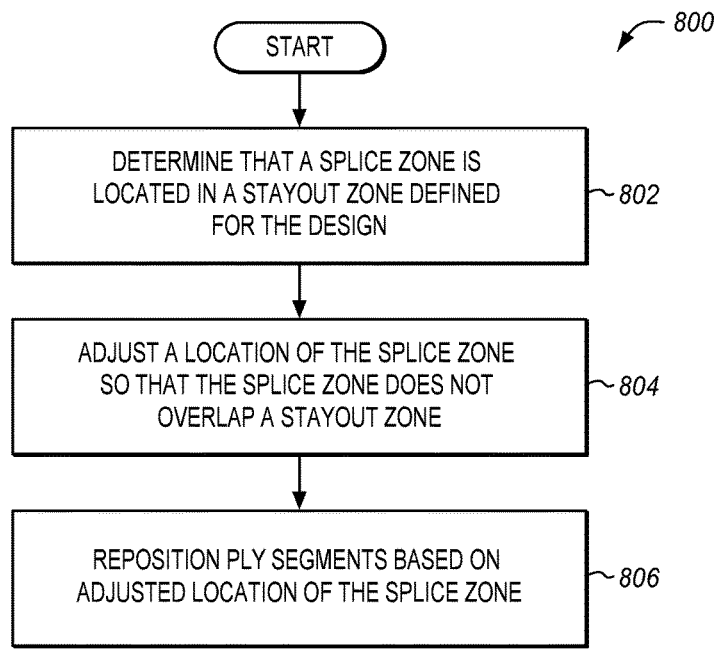
FIG. 8 is a flowchart illustrating a method for altering a location of a splice zone an illustrative embodiment.

FIG. 8 is a flowchart illustrating a method 800 for altering a location of a splice zone in order to account for a stayout zone an illustrative embodiment. Method 800 may be performed for example in steps 304 of method 300 of FIG. 3. According to method 800, controller 112 identifies locations of stayout zones for the design 116 (step 802). For example, stayout zone locations may be predefined within the design 116, or design 116 may be accompanied by data indicating locations for stayout zones. Controller 112 further determines that a splice zone is located within a stayout zone defined for the design 116 (step 804). For example, if the splice zone overlaps any spanwise portion of the stayout zone, the splice zone may be considered "within" the stayout zone. To address this issue, controller 112 adjusts a location of the splice zone (step 806), and repositions ply segments based on the adjusted location of the splice zone (step 808). Specifically, controller 112 moves the splice zone either in an up-fiber direction (e.g., inboard) or a down-fiber direction (e.g., outboard) until no portion of the splice zone overlaps the stayout zone. Phrased another way, stayout zones may be considered as having a higher priority than splice zones, hence stayout zones exclude the presence of splice zones in the same regions along the length of the design (i.e., to prevent overlap). The stacking sequence within the composite charge need not be symmetrical throughout the thickness of the composite charge. However, in some embodiments the stacking sequence is symmetrical in that fiber orientations may be the same regardless of whether the stacking sequence is traversed from top ply to bottom ply, or from bottom ply to top ply.

Figure 9:
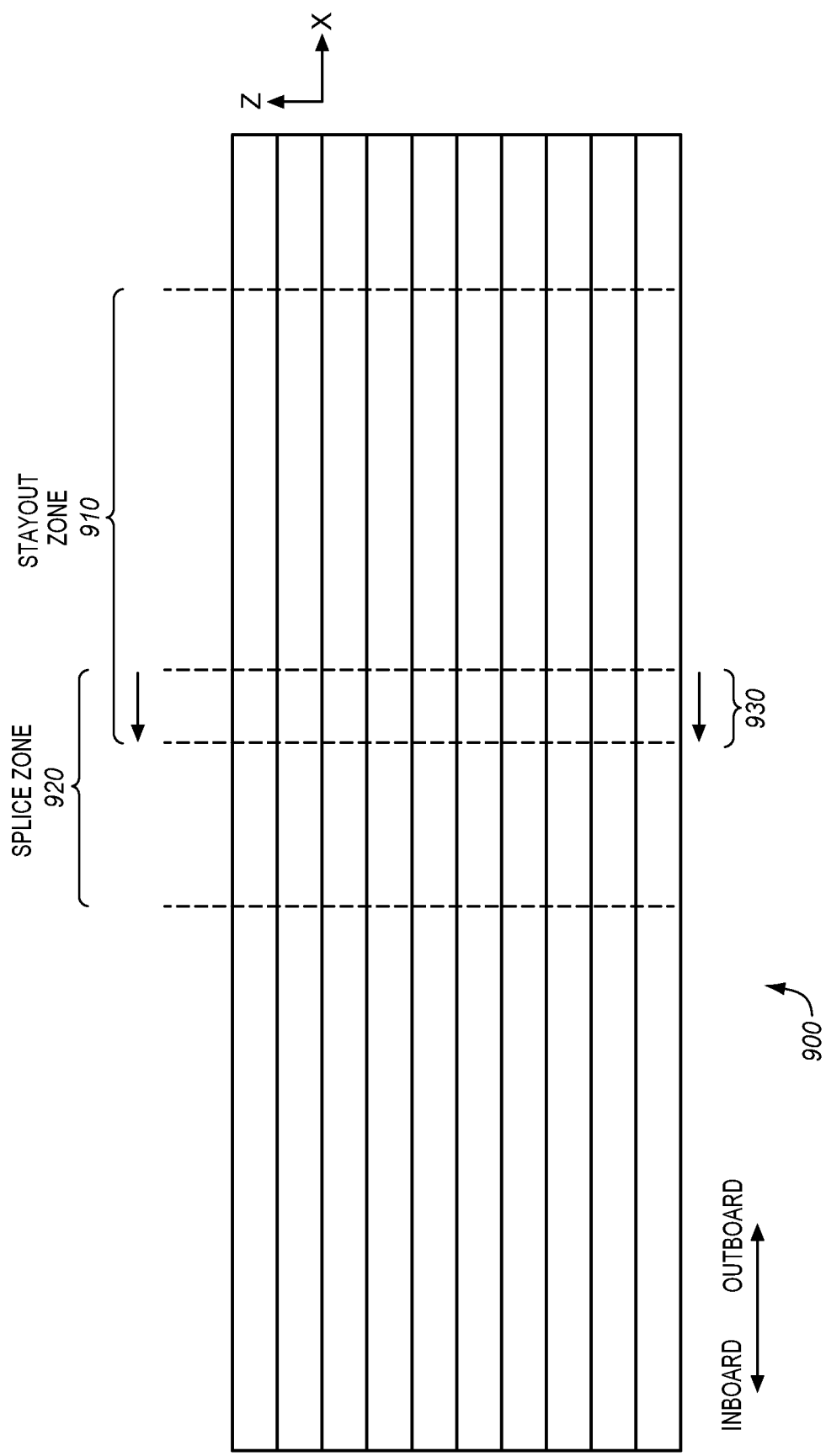
FIGS. 9-10 illustrate movement of a splice zone away from a stayout zone in an illustrative embodiment.
Figure 10:
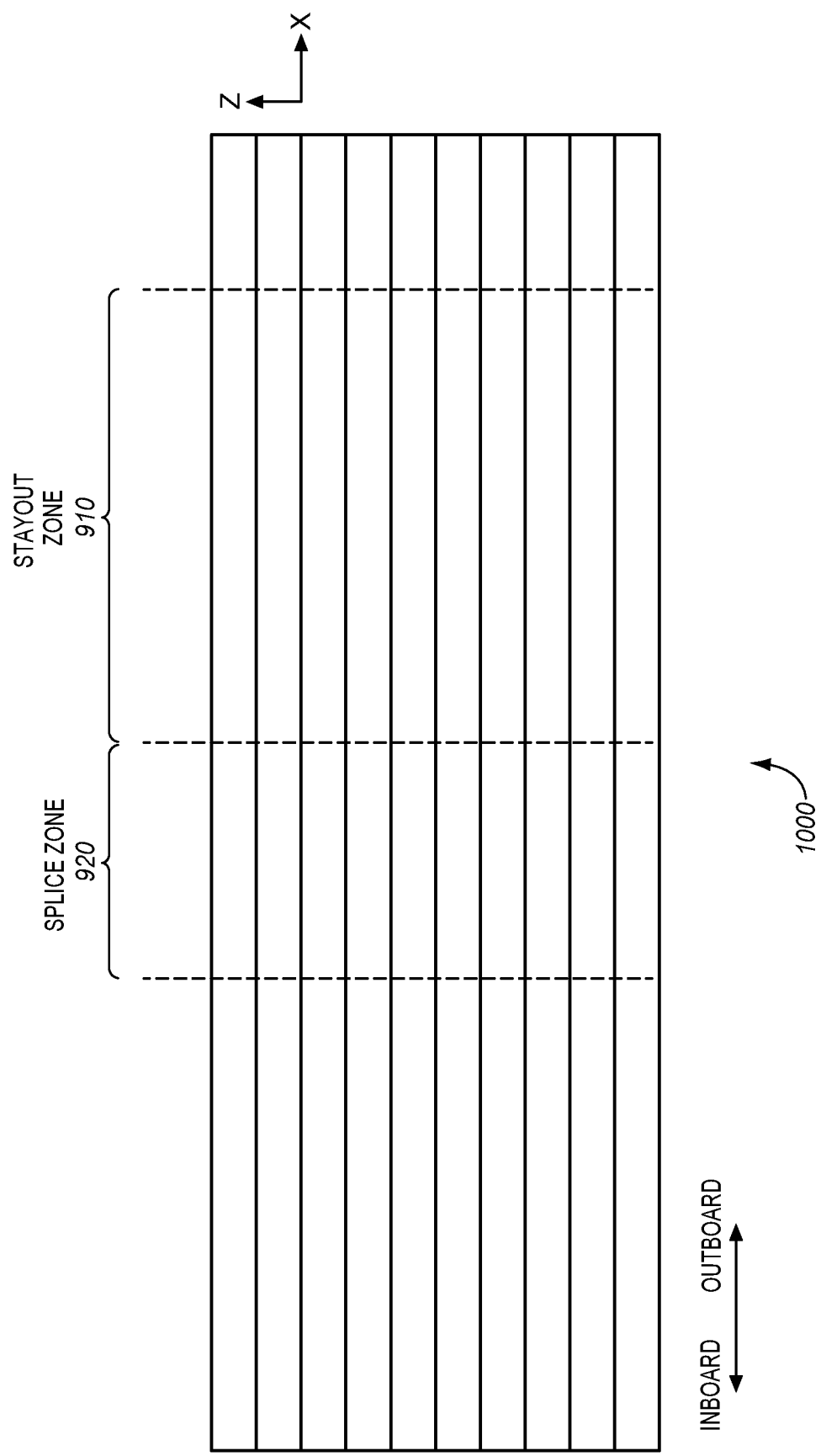

FIGS. 9-10 illustrate movement of a splice zone away from a stayout zone in an illustrative embodiment. In FIG. 9, a splice zone 920 within a design 900 overlaps an inboard portion of a stayout zone 910, resulting in overlap region 930. In FIG. 10, the splice zone 920 has been moved up-fiber to address this issue such that it abuts but does not overlap the stayout zone 910, resulting in a new design 1000. This process may be performed by locating a stayout zone, locating a splice zone, and determining a proximity of the splice zone to the stayout zone. If the splice zone overlaps the stayout zone, this may include adjusting a location of the splice zone relative to the stayout zone.

Figure 11:
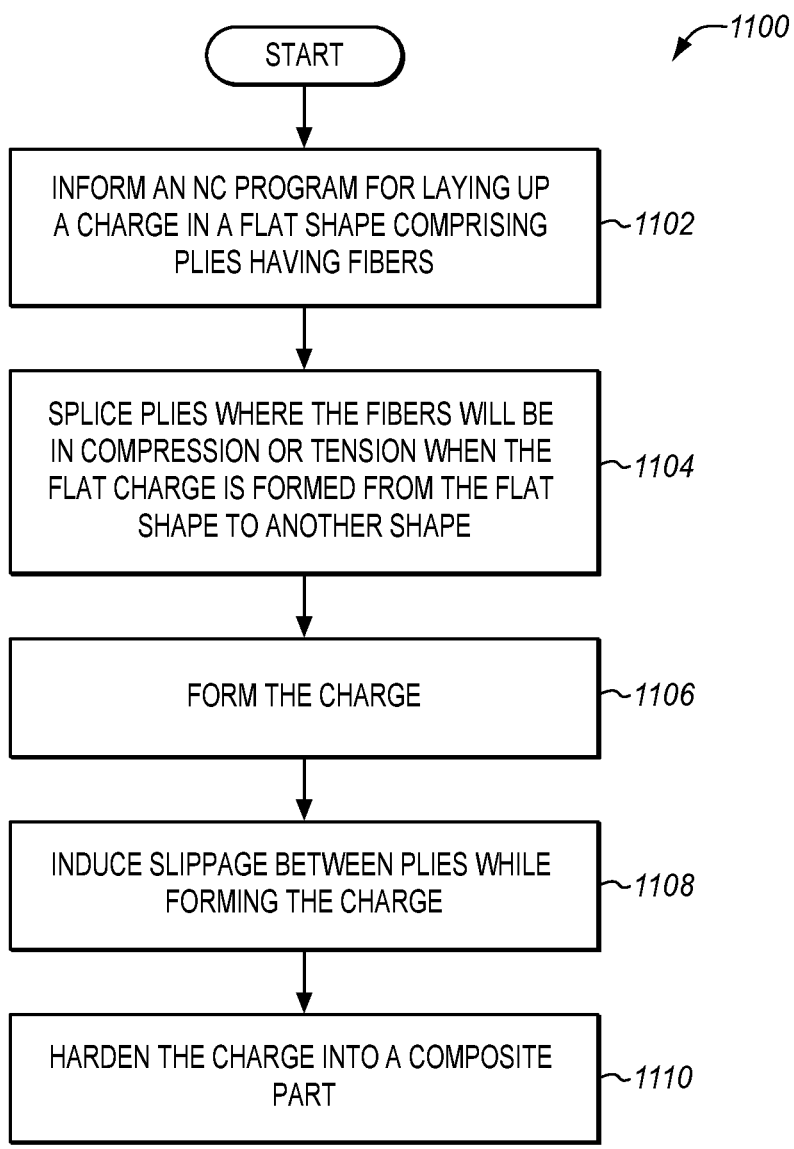
FIG. 11 is a flowchart illustrating a further method for fabricating a composite charge in an illustrative embodiment.

FIG. 11 is a flowchart illustrating a further method 1100 for fabricating a composite charge in an illustrative embodiment. According to method 1100, step 1102 includes informing NC program 122 for laying up a charge (e.g., composite charge 150) in a flat shape comprising plies having fibers. Step 1104 includes splicing plies where the fibers will be in compression or tension when the charge is formed the flat shape to another shape. The charge is formed in step 1106, and slippage between plies is induced while forming the charge, as illustrated in step 1108. In step 1110, the charge is hardened into a composite part. In a further embodiment, the method may include adapting a layup sequence of the charge for contour forming by adding splice zones for inclusion in the layup sequence and splicing plies to remove where the fibers will be in compression when the charge is formed.

Figure 12:
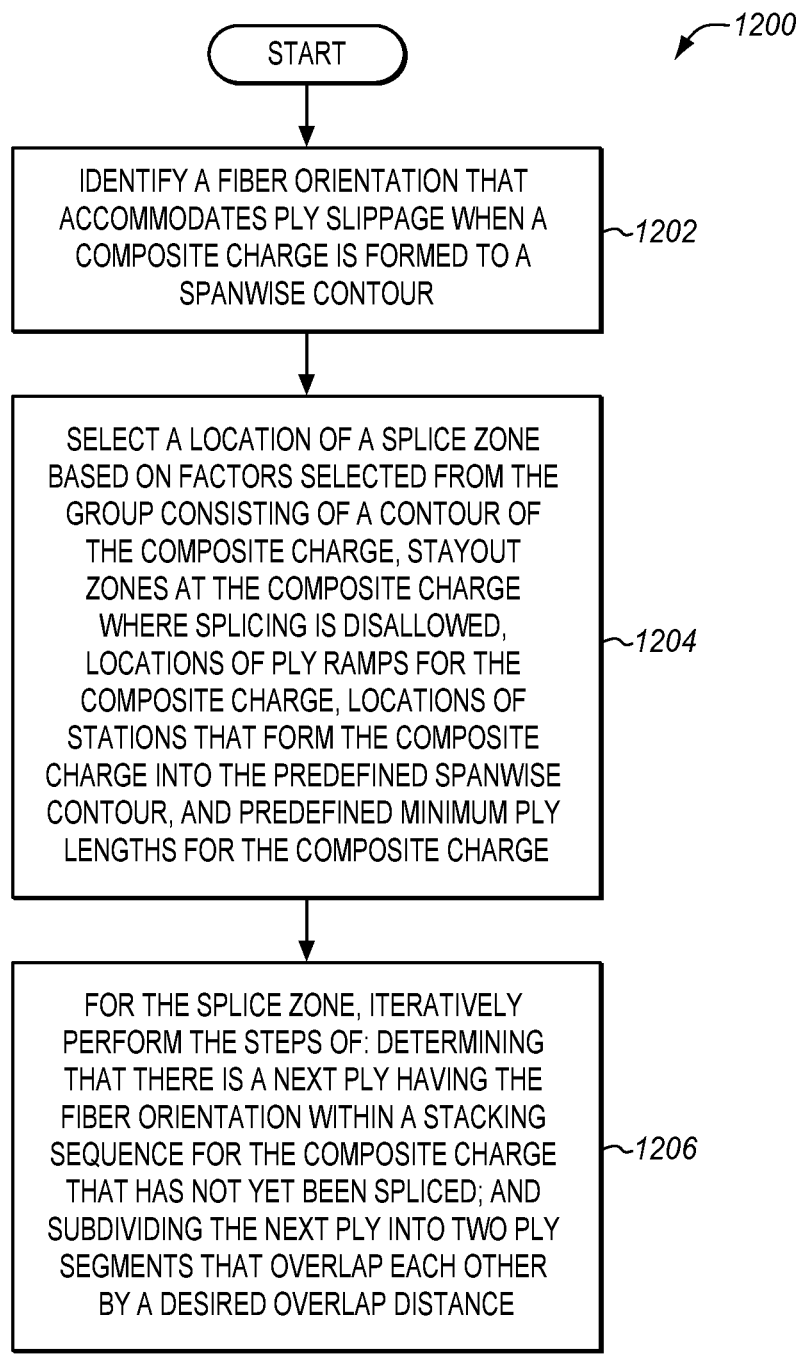
FIG. 12 is a flowchart illustrating a further method for fabricating a composite charge in an illustrative embodiment.
Figure 13:
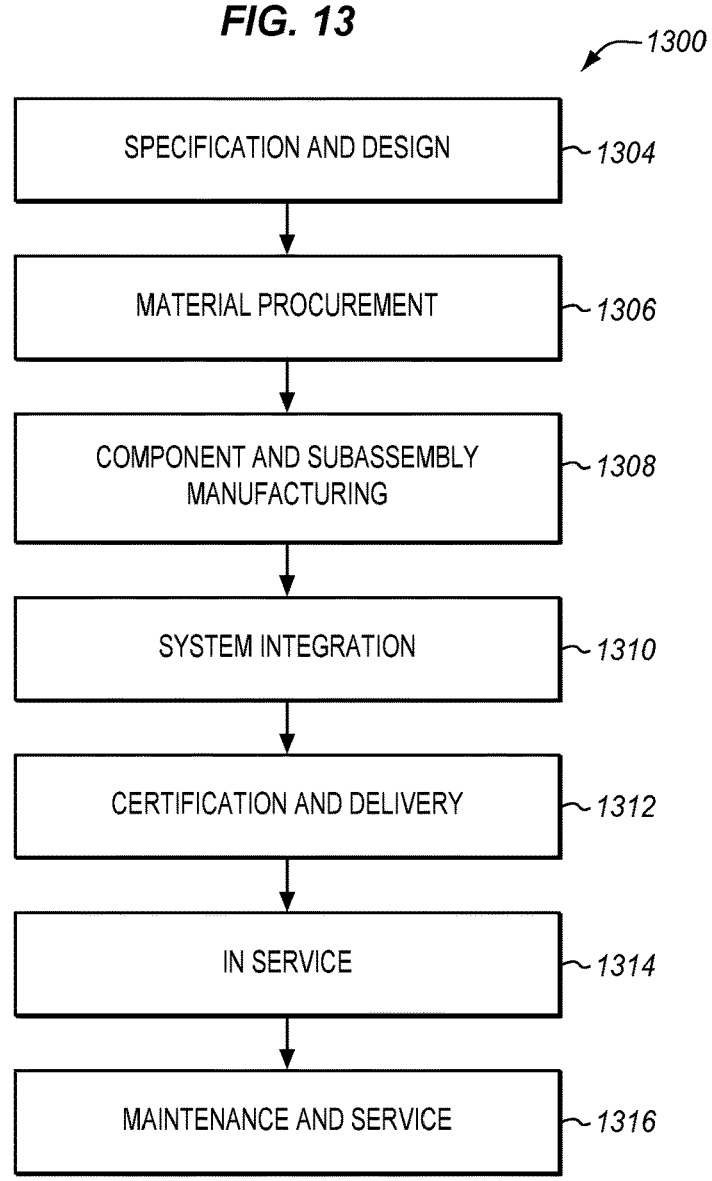
FIG. 13 is a flow diagram of aircraft production and service methodology in an illustrative embodiment.

FIG. 12 is a flowchart illustrating a further method 1200 for fabricating a composite charge in an illustrative embodiment. Method 1200 includes identifying a fiber orientation that accommodates ply slippage when a composite charge is formed to a spanwise contour (step 1202). Method 1200 also includes selecting a location of a splice zone based on factors selected from the group consisting of a contour of the composite charge, stayout zones at the composite charge where splicing is disallowed, locations of ply ramps for the composite charge, locations of stations that form the composite charge into the predefined spanwise contour, and predefined minimum ply lengths for the composite charge (step 1204). Method 1200 additionally includes, for the splice zone, iteratively performing the steps of: determining that there is a next ply having the fiber orientation within a stacking sequence for the composite charge that has not yet been spliced; and subdividing the next ply into two ply segments that overlap each other by a desired overlap distance (step 1206).

EXAMPLES

In the following examples, additional processes, systems, and methods are described in the context of a fabrication system for composite charges.

Figure 14:
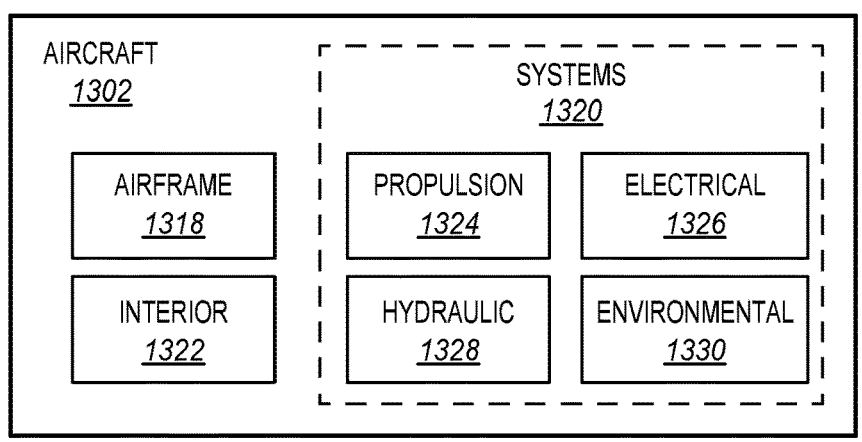
FIG. 14 is a block diagram of an aircraft in an illustrative embodiment.

Referring more particularly to the drawings, embodiments of the disclosure may be described in the context of aircraft manufacturing and service in method 1300 as shown in FIG. 132 and an aircraft 1302 as shown in FIG. 14. During pre-production, method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine work in maintenance and service 1316 (which may also include modification, reconfiguration, refurbishment, and so on). Apparatus and methods embodied herein may be employed during any one or more suitable stages of the production and service described in method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion system 1324, electrical system 1326, hydraulic system 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by method 1300 may include an airframe 1318 with a plurality of systems 1320 and an interior 1322. Examples of systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1300. For example, components or subassemblies corresponding to component and subassembly manufacturing 1308 may be fabricated or manufactured in a manner similar to components or subassemblies produced while the aircraft 1302 is in service. Also, one or more apparatus embodiments, method embodiments, or a combination thereof may be utilized during the subassembly manufacturing 1308 and system integration 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation during the maintenance and service 1316. For example, the techniques and systems described herein may be used for material procurement 1306, component and subassembly manufacturing 1308, system integration 1310, service 1314, and/or maintenance and service 1316, and/or may be used for airframe 1318 and/or interior 1322. These techniques and systems may even be utilized for systems 1320, including, for example, propulsion system 1324, electrical system 1326, hydraulic 1328, and/or environmental system 1330.

In one embodiment, a part comprises a portion of airframe 1318, and is manufactured during component and subassembly manufacturing 1308. The part may then be assembled into an aircraft in system integration 1310, and then be utilized in service 1314 until wear renders the part unusable. Then, in maintenance and service 1316, the part may be discarded and replaced with a newly manufactured part. Inventive components and methods may be utilized throughout component and subassembly manufacturing 1308 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a composite part, the method comprising:
    receiving a design comprising a Numerical Control (NC) program that defines a stacking sequence for a composite charge comprising plies that have different fiber orientations;
    defining a splice zone within the design;
    modifying the NC program to include instructions for splicing plies where the fibers will be in compression or tension when the composite charge is formed from a flat shape to another shape; and
    fabricating a composite part defined by the NC program, including splicing plies where the fibers will be in compression or tension when the composite charge is formed from the flat shape to the other shape.

2. The method of claim 1 wherein:
    modifying the NC program comprises:
        identifying a stacking sequence of plies within the splice zone; and
        subdividing a ply within the stacking sequence into ply segments.

3. The method of claim 2 further comprising:
    iteratively performing the steps of:
        determining that there is a next ply within the stacking sequence that has not yet been spliced; and
        subdividing the next ply into two ply segments that overlap each other by a desired overlap distance.

4. The method of claim 3 further comprising:
    the NC program includes instructions for a designed start and stop of each ply segment along a spanwise direction.

5. The method of claim 1 further comprising:
    locating a stayout zone;
    locating a splice zone;
    determining a proximity of the splice zone to the stayout zone; and
    determining whether to move the splice zone, based on the proximity.

6. The method of claim 5 further comprising:
adjusting a location of the splice zone relative to the stayout zone, if the splice zone overlaps the stayout zone.

7. The method of claim 1 wherein:
the splicing defines splice zones that are each longer than an overlap distance between ply segments plus a tolerance of a machine that will be laying up the ply segments.

8. The method of claim 1 further comprising:
preventing the splice zone from overlapping other splice zones in the composite charge.

9. The method of claim 1 wherein:
the splice zone splices only plies having a zero degree fiber orientation.

10. The method of claim 1 wherein:
fabricating the composite part is performed via a layup machine; and the method further comprises:
applying a stagger distance between plies in the splice zone, wherein the stagger distance between plies equals a number of the plies being spliced, multiplied by a quantity equal to:
an overlap distance plus a tolerance distance plus a stagger distance of the layup machine.

11. A method of laying up a composite charge, the method comprising:
informing a Numerical Control (NC) program for laying up a composite charge in a flat shape comprising plies having fibers; and
if there are fibers will be in compression or tension when the composite charge is formed from the flat shape to another shape, splicing plies where the fibers will be in compression or tension when the composite charge is formed from the flat shape to another shape.

12. The method of claim 11 further comprising:
adapting a layup sequence of the composite charge for contour forming by adding splice zones for inclusion in the layup sequence; and
if there are fibers will be in compression or tension when the composite charge is formed from the flat shape to another shape, splicing plies to remove where the fibers will be in compression or tension when the composite charge is formed.

13. The method of claim 11 further comprising:
identifying a stacking sequence of plies within a splice zone; and
subdividing a ply within the stacking sequence into ply segments.

14. The method of claim 13 further comprising:
iteratively performing the steps of:
determining that there is a next ply within the stacking sequence that has not yet been spliced; and
subdividing the next ply into two ply segments that overlap each other by a desired overlap distance.

15. The method of claim 14 further comprising:
including instructions in the NC program for a designed start and stop of each ply segment along a spanwise direction.

16. The method of claim 11 further comprising:
locating a stayout zone;
locating a splice zone;
determining a proximity of the splice zone to the stayout zone; and
determining whether to move the splice zone, based on the proximity.

17. The method of claim 11 wherein:
preventing the splice zone from overlapping other splice zones in the composite charge.

18. The method of claim 11 wherein:
the splice zone splices only plies having a zero degree fiber orientation.

19. The method of claim 11 wherein:
fabricating the composite part is performed via a layup machine; and the method further comprises:
applying a stagger distance between plies in the splice zone, wherein the stagger distance between plies equals a number of the plies being spliced, multiplied by a quantity equal to:
an overlap distance plus a tolerance distance plus a stagger distance of the layup machine.

20. The method of claim 11 further comprising:
drape forming the composite charge.

* * * * *